United States Patent [19]

Culler

[11] 4,287,566
[45] Sep. 1, 1981

[54] ARRAY PROCESSOR WITH PARALLEL OPERATIONS PER INSTRUCTION

[75] Inventor: Glenn J. Culler, Santa Barbara, Calif.

[73] Assignee: Culler-Harrison Inc., Goleta, Calif.

[21] Appl. No.: 80,032

[22] Filed: Sep. 28, 1979

[51] Int. Cl.³ .................... G06F 9/28; G06F 15/16; G06F 7/52
[52] U.S. Cl. .................................. 364/754; 364/200
[58] Field of Search ............... 364/200, 754, 757, 759, 364/900

[56] References Cited

U.S. PATENT DOCUMENTS

| | | | |
|---|---|---|---|
| 3,771,141 | 11/1973 | Culler | 364/200 |
| 3,895,357 | 7/1975 | Schwartz et al. | 364/200 |
| 3,979,728 | 9/1976 | Reddaway | 364/200 |
| 4,051,551 | 9/1977 | Lawrie et al. | 364/200 |
| 4,101,960 | 7/1978 | Stokes et al. | 364/200 |

Primary Examiner—Jerry Smith

Attorney, Agent, or Firm—Freilich, Hornbaker, Wasserman, Rosen & Fernandez

[57] ABSTRACT

An array processor particularly useful in performing calculations utilizing data from two distinct two-dimensional arrays. More particularly, the array processor provided by the invention incorporates multiplication, addition, subtraction, transfer and storage means whereby arithmetic and storage operations, and two-dimensional array access operations can be conducted in parallel, thereby reducing the time required for complex and cumulative vector computations which could be associated with voice digital encoding and decoding systems. An architecture scheme is described which allows parallel operations to be effected, and a simplified addressing means is disclosed for vectorally accessing locations within two two-dimensional arrays. In addition, a coding and instruction scheme is disclosed which is compatible with the disclosed architecture.

11 Claims, 5 Drawing Figures

4,287,566

ARRAY PROCESSOR WITH PARALLEL OPERATIONS PER INSTRUCTION

BACKGROUND OF THE INVENTION

This invention relates generally to digital data processing equipment, and more particularly to an improved array processor particularly suited for vector arithmetic utilizing data from at least one two-dimensional array as an input.

Many computational processes utilize vector arithmetic in which constants are stored in two-dimensional arrays which are periodically accessed to provide inputs to a computational algorithm. Such computational processes could be useful in a digital voice communication link where analog voice signals are encoded and decoded. The decoding process utilizes vector arithmetic and is composed of a long list of repetitive steps in which the results of one step are accumulated and added to the results of a succeeding step. Conventional systems for accomplishing this type of arithmetic frequently have utilized serial processes wherein each individual computation is performed, the results stored, an array accessed for the next computation, and the computation re-performed and added to the results of the preceding computation. Such processes are lengthy and have limited the efficiency of digital voice communication systems. The present invention solves the above problems by providing an array processor and an associated architectural scheme wherein multiple operations such as multiplication, addition, subtraction, transfer and storage can be effected in parallel with a single input instruction, thereby greatly increasing the speed at which such computations can be effected.

SUMMARY OF THE INVENTION

The invention provides an array processor having a multiplication means, input means to the multiplication means, output means from the multiplication means, storage means, addition and subtraction means responsive to signals from the output means and from the storage means, means for providing signal inputs from at least one array to the multiplication input means, the storage means, and the addition and subtraction means, and interconnection means allowing selected multiplication, storage, addition, subtraction, and transfer operations to occur in parallel in response to predetermined input instructions. In addition, in an array processing system having a two-dimensional data storage array formed of X columns and Y rows, and capable of performing multiplication, addition, subtraction, storage and transfer operations in parallel in response to a single input instruction, the invention provides an addressing means for the array which includes an address register for identifying a predetermined storage location within the array, a means for addressing vector locations within the array, and a means for addressing vector locations within the array with respect to the predetermined location.

More particularly, equations of the type $$f_{m+1}(n) = f_m(n) + K_{m+1} b_m(n-1)$$

$$b_{m+1}(n) = K_{m+1} f_m(n) + b_m(n-1)$$

require calculations wherein $$(\text{Fraction} \cdot \text{Integer})_{RND} + \text{Integer} \cdot \text{Integer}$$

must be performed.

Repetitive operations of the above type can require access to two-dimensional arrays, multiplication, addition and subtraction, transfer and storage operations. The invention provides an architecture interconnecting adders, storage registers, multipliers, and input devices and discloses an instruction scheme whereby parallel operations in response to a single input instruction can be performed. The input instructions are chosen so that vectorial access to the two-dimensional array can be readily achieved by indexing an address register by integer increments and multiples of the number of X columns within the array.

The exemplary embodiment described below interconnects two two-dimensional arrays, a multiplier having input and output registers, three adders, and four storage registers or accumulators to effect calculations associated with the above equation types. The exemplary embodiment provides a plurality of buses and associated access gates, and discloses a coding scheme whereby array-type calculations can be effected in parallel, thereby providing a processing speed unachievable by conventional processors. A specific implementation of the exemplary embodiment is provided in Appendix A located in the official Patent and Trademark Office file and incorporated herein by reference.

DETAILED DESCRIPTION

As required, a detailed illustrative embodiment of the invention disclosed herein exemplifies the invention and is currently considered to be the best embodiment for such purposes. However, it will be apparent to those skilled in the art that many changes and modifications may be made without departing from the invention in its broader aspects. Accordingly, the specific embodiment disclosed is only representative in providing a basis for the claims which define the scope of the present invention.

As previously explained, the invention provides an array processor organized in a manner which permits multiple operations, including arithmetic and data transfer operations, to be executed in parallel at each clock time in response to a single instruction. In a typical computation of linear prediction, let f and b represent forward and backward residuals and K denote a reflection coefficient. Since $-1 < K < 1$, direct lattice filter equations $$f_{m+1}(n) = f_m(n) + K_{m+1} b_m(n-1)$$

$$b_{m+1}(n) = K_{m+1} f_m(n) + b_m(n-1) \qquad (1)$$

require that $$(\text{Fraction} \times \text{Integer})_{RND} + \text{Integer} \rightarrow \text{Integer} \quad (2)$$

be performed as an array process. The inverse filter $$f_m(n) = f_{m+1}(n) - K_{m+1} b_m(n-1)$$

$$b_{m+1}(n) = K_{m+1} f_m(n) + b_m(n-1) \quad (3)$$

incorporates feedback and for small amplitudes engenders a limit cycle pathology. The array processor incorporates an X and Y array, and provides a means for a rapid computation of the above equation types.

Figure 1:
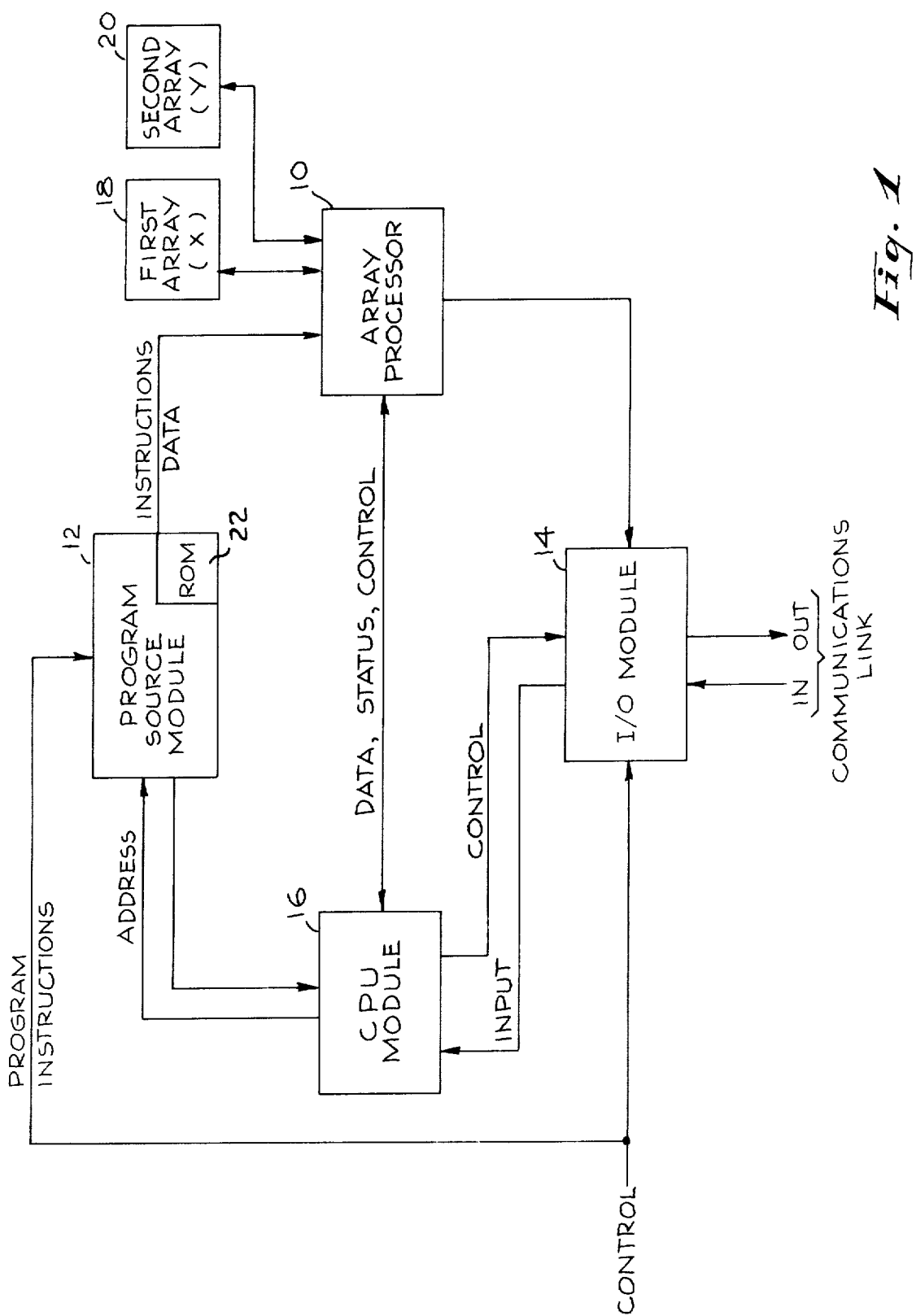
FIG. 1 is a block diagram of a computational system incorporating an array processor provided by the invention.

Referring now to FIG. 1, an array processor 10, a program source module 12, an input-output (I/O) module 14, and a central processing unit (CPU) module 16 are operably connected. In addition, a first or X two-dimensional array 18 and a second or Y two-dimensional array 20 are provided, the information contained therein being utilized in computations as above described. The array processor 10 carries out instructions provided by the program source module 12 and receives certain data inputs from a read-only memory (ROM) 22 contained in the program source module 12. The array processor 10 provides data, status and control information to the CPU module 16. The CPU module 16 is chosen to perform program sequencing, data addressing, indexing, array processor 10 control, and I/O module 14 control. The program source module 12 is addressed by the CPU module 16 and receives control inputs from a remote source which could be a computer (not shown). The I/O module 14 provides an interface between the array processor 10 and an external using device which could be a communications link. The present invention relates primarily to the array processor 10 and its associated first and second arrays, 18 and 20, respectively.

Figure 2:
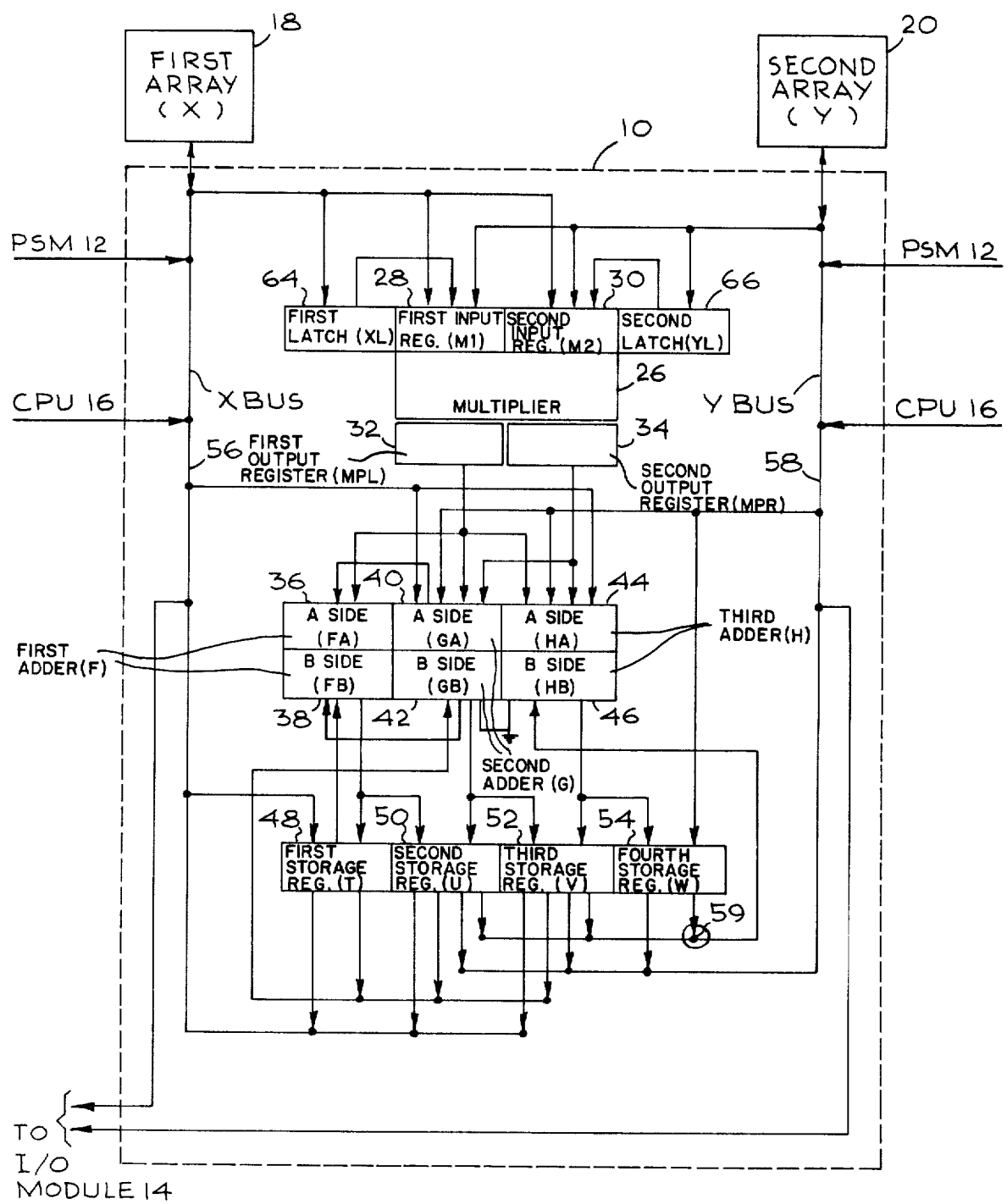
FIG. 2 is a block diagram showing two two-dimensional arrays, an array processor, and the interconnection architecture for the elements contained within the array processor.

Referring now to FIG. 2, the array processor 10, its associated components and interconnection architecture are shown. The array processor 10 includes a multiplier 26, and first and second multiplier input registers, 28 and 30, which are designated M1 and M2, respectively. These input registers 28 and 30 contain input values to be multiplied. The results of a multiply operation are provided by a first or MPL output register 32 and a second or MPR output register 34. Each of the four registers 28, 30, 32 and 34 are chosen to have the same data storage capacity. First, second, and third adders are provided, these adders being designated as F,G, and H adders, respectively. Each adder has an A and B side, the A side containing a value to be added and the B side containing a value to be added before an add or subtract instruction, or a sum value after an add or subtract instruction. Thus, the F adder has an A side 36 and a B side 38; the G adder an A side 40 and B side 42; and the H adder an A side 44 and B side 46. First, second, third and fourth storage registers shown as T, U, V and W registers, 48, 50, 52 and 54, respectively, are provided. Two main buses are provided, an X Bus 56 and a Y Bus 58. The W register 54 is connected to receive inputs from the Y Bus 58 and the B side of the H adder 46, and to provide output signals to the Y Bus 58 and the A side of the G and H adders. Each arrow ending in a dot as shown at 59 indicates a controllable gate. Thus, the contents of the W register 54 can be made available to the B side of the H adder by an appropriate command opening the gate shown at 59. All other gates can be similarly controlled depending on the operation being conducted.

The T register 48 can store either a signal from the X Bus 56 or an output from the B side of the F adder 38. The contents of the T register can be provided to the B side of the G adder 42 or the X Bus. The U register 50 can receive inputs from the B side of the F and G adders, 38 and 42, respectively, and can provide its contents to both the X and Y Buses, 56 and 58, respectively, and to the B side of the G and H adders, 42 and 46. The V register 52 also receives inputs from the B side of the G and H adders, 42 and 46, and can provide its contents to both the X and Y Buses, 56 and 58, respectively, and to the B side of the G and H adders, 42 and 46. The first input register 28 to the multiplier 26 can receive inputs from both the X and Y Buses and from a first or XL latch register 64 which can also receive an input from the X Bus 56. The second input register 30 can receive inputs from both the X and Y Buses, 56 and 58, and a second or YL latch register 66. The contents of the second output register 34 are provided to the A side of the G and H adders, 40 and 44, and the contents of the first output register 32 are provided to the A side of the F, G and H adders, 36, 40 and 44, respectively. A sign bit is provided from the B side of the G adder 42 to the B side of the F adder 38. The A side of the G and H adders, 40 and 44, can both receive inputs from the X and Y Buses 56 and 58. As will be explained below, the elements of the array processor 10 interconnected as shown in FIG. 2 can be utilized to solve equations utilizing arrays as input variables and controlled so that arithmetic, transfer, and storage operations can be simultaneously conducted.

Control of the array processor 10 is effected by two forty-bit words shown below.

| PJRM | FG | XBSGBTU | XAXMOVE |
|------|-----|---------|---------|
| 16 | 8 | 8 | 8 |

←———————— 40 bits ————————→

| VALUE | HXLYL | YBSHBVW | YAYMOVE |
|-------|-------|---------|---------|
| 16 | 8 | 8 | 8 |

←———————— 40 bits ————————→

The contents of each word will be explained below. PJRM controls the multiply operation and contains 16 bits. Eight of the sixteen bits are utilized to control the array processor 10, the other 8 bits being used to control information from the program source module 12 and its associated ROM 22 as shown in FIG. 1.

TABLE 1

| Code | Multiply Operation | Multiplicans | |
|------|-------------------|--------------|---|
| 0 | I | MX | MY |
| 1 | I:PL | XBS | XBS |
| 2 | I:PR | YBS | YBS |
| 3 | I:P | XL | XL |
| 4 | | YL | YL |
| ⋮ | | | |
| 32 | | | |
| No. of bits | 3 | 5 | |

The multiply operation can be of four types including (1) two numbers in 2's complement format designated as I; (2) a 2's complement number in M1 and a positive number in M2, designated as I:PL; (3) a 2's complement number in M2 and a positive number in M1, designated as I:PR; and (4) positive numbers in both M1 and M2, designated as I:P. The multiplicans are selected by a five bit code shown in Table 1. The references to MX and MY relate to internal registers in the multiplier 26 shown in FIG. 3. A specific implementation of portions of the multiply operation is shown in Appendix A, pages 40–44.

Table 2 shows control instruction for the F and G adders.

TABLE 2

| CODE | F | FG | G |
|---|---|---|---|
|  |  | FG |  |
| 0 | 0 | NϕϕP | 0 |
| 1 | T−MPL | GCO→FCI | GB − MPL |
| 2 | MPL−T |  | MPL − GB |
| 3 | T+MPL |  | GB + MPL |
| 4 | T + 0 |  | GB EϕR MRL |
| 5 | T − GAS |  | GB − XBS |
| 6 | GAS − T |  | XBS − GB |
| 7 | T + GAS |  | GB + XBS |
| 10 |  |  | GB EϕR XBS |
| 11 |  |  | GB − MPR |
| 12 |  |  | MPR − GB |
| 13 |  |  | GB + MPR |
| 14 |  |  | GB + 0 |
| 15 |  |  | GB − YBS |
| 16 |  |  | YB − GB |
| 17 |  |  | GB + YB |
| BITS | 3 | 1 | 4 |

Thus, the F adder is controlled by the first three bits and the G adder by the last four bits. The various arithmetic steps are self explanatory. For example, the digital word 01110111 would cause the F adder to add the contents of the T register 48 and the contents of the first output register 32, move GCO to FCI and add the B side of the G register 42 to the signal on the X bus 56. A specific embodiment of the F and G adders is shown in appendix A, pages 45–50.

Instructions for controlling signals to the X Bus 56, to the B side of the G register 42, and the T and U registers, 48 and 50, respectively, are shown in Table 3.

TABLE 3

| CODE | XBS | GB | TU |
|---|---|---|---|
|  | XBSGBTU |  |  |
| 0 | NϕϕP | 0 | NϕϕP |
| 1 | U | U | XBS→T F→U |
| 2 | V | V | F→T G→U |
| 3 | T | T | XBS→T G→U |
| 4 | PX |  | F→T |
| 5 | DL |  | F→U |
| 6 | PRI |  | XBS→T |
| 7 | ADJ |  | G→U |
| BITS | 3 | 2 | 3 |

X refers to the output of the first array 18. Thus, either X or the contents of the U, V or T registers, 50, 52 or 48, can be placed on the X Bus while simultaneously providing the contents of the U, V or T registers, or zero, to the B side of the G register 42. The last three bits of same instruction also causes the T and U registers, 48 and 50, to be configured as shown.

Controls for the first array 18 are shown in Table 4.

TABLE 4

| CODE | XA | X MOVE |
|---|---|---|
|  | XAXMOVE |  |
| 0 | NϕϕP | NϕϕP |
| 1 | INC XA | XBS→X |
| 2 | INC XA(2) | X→XBS |
| 3 | INC XA(XC) | XBS→XC |
| 4 | INC XA(XC + 1) | XC→XBS |
| 5 | INC XA(XC − 1) | XA→XC |
| 6 | INC XA(VAL) | XA→XC→X |
| 7 | XC→XA | XA→XC→XBS |
| 10 | VAL→XA | XC→X |
| 11 | DEC XA | X→XC |
| 12 | DEC XA(2) |  |
| 13 | DEC XA(XC) |  |
| 14 | DEC XA(XC + 1) |  |
| 15 | DEC XA(XC − 1) |  |
| 16 | DEC XA(VAL) |  |
| 17 |  |  |
| BITS | 4 | 4 |

The purpose of the XAXMOVE instruction is to access the memory locations stored in the first array 18 so that they can be placed on the X Bus 56. As will be explained in further detail below, X accesses a memory location in the first two-dimensional array 18. An increment (INC) of XA accesses the next higher memory location in the array 18, and a decrement (DEC) accesses the next lower memory location in the array 18. The next two higher memory locations can be accessed (INC XA(2)) if the first 4 bits of XAXMOVE are 0010. Predetermined memory locations can also be accessed as shown by CODE 10 in Table 4. The references to XC refer to a C register to be explained below, the contents of the C register generally having the number of address locations in one row of the two-dimensional array. If the number of values in a single line of the two-dimensional array are stored in the C register, then vectorial access to all memory locations surrounding a predetermined memory location can be quickly accessed by increments of XC+1, XC, XC−1, −XC, −XC+1, and −XC−1. The rest of the various instructions are self-explanatory.

TABLE 5

| CODE | GH | HA | H | XL | YL |
|---|---|---|---|---|---|
|  |  | HXLYL |  |  |  |
| 0 | NϕϕP | MPL | 0 | NOOP | NOOP |
| 1 | HCϕ→GCI | XB | HB − HA | XBS→XL | YBS→YL |
| 2 |  | MPR | HA − HB |  |  |
| 3 |  | YB | HB + HA |  |  |
| 4 |  |  | HB EϕR HA |  |  |
| 5 |  |  | HB  HA |  |  |
| 6 |  |  | HB  HA |  |  |
| 7 |  |  | HB + 0 |  |  |
| BITS | 1 | 2 | 3 | 1 | 1 |

Table 5 shows the instructions for controlling inputs to the A side of the H adder 44, operation of the H adder, and inputs from the X Bus 56 and Y Bus 58 to the first latch register 64, and the second latch register 66, respectively. For example, if HXLYL = 10101111, then HCO would be transferred to GCI, the contents of the X Bus 56 would be provided to the A side of the H adder 40, the contents of the A and B sides of the H adder 44 and 46 would be summed, the contents of the X Bus 56 would be stored in the first latch register 64, and the contents of the Y Bus 58 would be stored in the second latch register 66. Thus, for this single portion of the input instruction, four separate operations or steps occur simultaneously because of the interconnection and coding scheme provided by the invention.

The command YBSHBVW controlling the Y Bus 58, the B side of the H adder 46, and the V and W storage registers, 52 and 54 is shown below in Table 6.

TABLE 6

| CODE | YBSHBVW | | |
|------|-----|-----|-----|
|      | YBS | HB  | VW  |
| 0    | R   | O   | NφφP |
| 1    | U   | U   | H→V YBS→W |
| 2    | V   | V   | G→V H→W |
| 3    | W   | W   | G→V YBS→W |
| 4    | PY  |     | G→V |
| 5    | DR  |     | H→V |
| 6    | DA  |     | YBS→W |
| 7    | NφφP |    | H→W |
| BITS | 3   | 2   | 3   |

Use of this instruction is similar to the of the XBSGBTU instruction described in Table 3.

Instructions for access to memory locations in the second array 20 are shown in Table 7 below, and are the same as those previously explained for XAXMOVE.

TABLE 7

| CODE | YAYMOVE | |
|------|------|------|
|      | YA   | Y MOVE |
| 0    | NφφP | NφφP |
| 1    | INC YA | YBS→Y |
| 2    | INC YA(2) | Y→YBS |
| 3    | INC YA(YC) | YBS→YC |
| 4    | INC YA(YC + 1) | YC→YBS |
| 5    | INC YA(YC − 1) | YA→YC |
| 6    | INC YA(VAL) | YA→YC→Y |
| 7    | YC→YA | YA→YC→YBS |
| 10   | VAL→YA | YC→Y |
| 11   | DEC YA | Y→YC |
| 12   | DEC YA(2) |  |
| 13   | DEC YA(YC) |  |
| 14   | DEC YA(YC + 1) |  |
| 15   | DEC YA(YC − 1) |  |
| 16   | DEC YA(VAL) |  |
| 17   |  |  |
| BITS | 4 | 4 |

Figure 3:
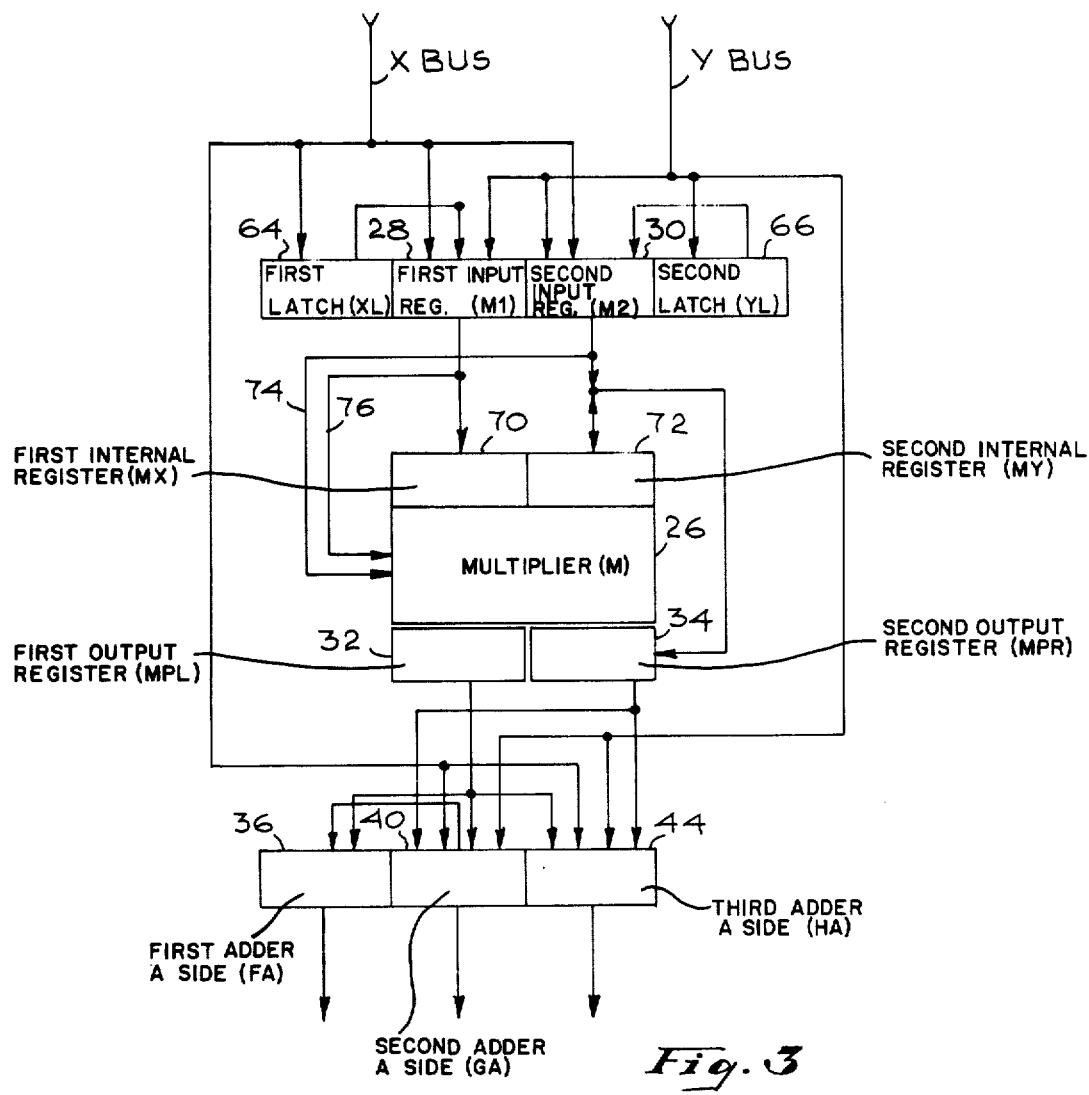
FIG. 3 is a block diagram illustrating the multiplier and the interconnection means for effecting fractional multiplication.

Referring to FIG. 3, the multiplier 26 is expanded to show two internal register MX and MY, 70 and 72, respectively. If one of the words in the first or second input register 28 or 30, is a fraction, then a fraction signal on either line 74 or 76 is provided to the multiplier 26. The multiplier is chosen to round the product of a fractional multiplication so that the negative of the rounded number is equal to a negative of the number when rounded. This result is obtained by choosing the multiplier so that if the sign bit of the number to be rounded is zero, 0.111 ... 1 is added and the result truncated, and if the sign bit is one, 0.1000 ... 0 is added and the result truncated. The contents of the first output register 32 of the multiplier 26 are provided to the A sides of the F, G and H adders, and the contents of the second output register 34 are provided to the A sides of the F and G adders, any overflow going into the A side of the F adder 36.

Separate internally-generated clock signals are used to clock the MX and MY registers, 70 and 72, respectively, and first and second latch registers, 64 and 66, respectively. Internal instruction codes for the multiply operation are shown in Table 8 below.

TABLE 8

| Code | M | M1 | M2 |
|------|---|-----|-----|
| 0    | I    | YL  | YL  |
| 1    | I:PL | YBS | YBS |
| 2    | I:PR | XBS | XBS |
| 3    | I:P  | XL  | XL  |

The M column instructions are the same as previously explained. In addition, instructions are also provided to set the sign of FA sign line 68, and set the A side of the F, G and H adders 36, 40 and 44 to zero.

The B sides of the F and G adders, 38 and 42, are controlled by internally generated microinstructions shown in Tables 9, 10, and 11 below

TABLE 9

| CODE | F | G |
|------|---|---|
| 0    | O | O |
| 1    | B − A | B − A |
| 2    | A − B | A − B |
| 3    | A + B | A + B |
| 4    |   | A EOR B |
| 5    |   |   |
| 6    |   |   |
| 7    |   |   |
|      | FφP | GφP |

TABLE 10

| CODE | T | U | V |
|------|---|---|---|
| 0 | NOOP | NOOP | NOOP |
| 1 | NOOP | NOOP | NOOP |
| 2 | XBS→T | F→U | G→V |
| 3 | F→T | G→U | H→V |
|   | FXBSSE | GFSE | HGSE |
|   | TCLK | UCLK | VCLK |

TABLE 11

| CODE | GB | XBS |
|------|----|-----|
| 0 | O | NONE |
| 1 | U | U |
| 2 | V | V |
| 3 | T | T |
|   | GBφP | TUVXB |

The B's and A's in Table 9 refer to the B and A sides of the F and G adders, and the alphabetic identifiers at the bottom of each column merely provide a means for identifying the particular function. Separate clock signals for the T, U and V registers, 48, 50 and 52, are provided as indicated in Table 10. Referring to Table 11, and by way of example, if GBφP is 01 and TUVXB is 10, then the contents of the B side of the G register 42 would be provided to the U register 50, and the contents of the V register 42 would be provided to the X Bus 56.

The B side of the H adder 46 is also controlled by internally generated microinstructions shown in Tables 12 and 13 below.

TABLE 12

| CODE | HB | W |
|------|-----|-----|
| 0 | O | NOOP |
| 1 | B − A | NOOP |
| 2 | A − B | YBS→W |
| 3 | A + B | H→W |

TABLE 12-continued

| CODE | HB | W |
|------|-----|---|
| 4 | A B | |
| 5 | A B | |
| 6 | A B | |
| 7 | −1 | |
| | HφP | HYBSSE WCLK |

TABLE 13

| CODE | HB | YBS |
|------|-----|-----|
| 0 | O | R |
| 1 | U | U |
| 2 | V | V |
| 3 | W | W |
| | HBφP | WVURYB |

Figure 4:
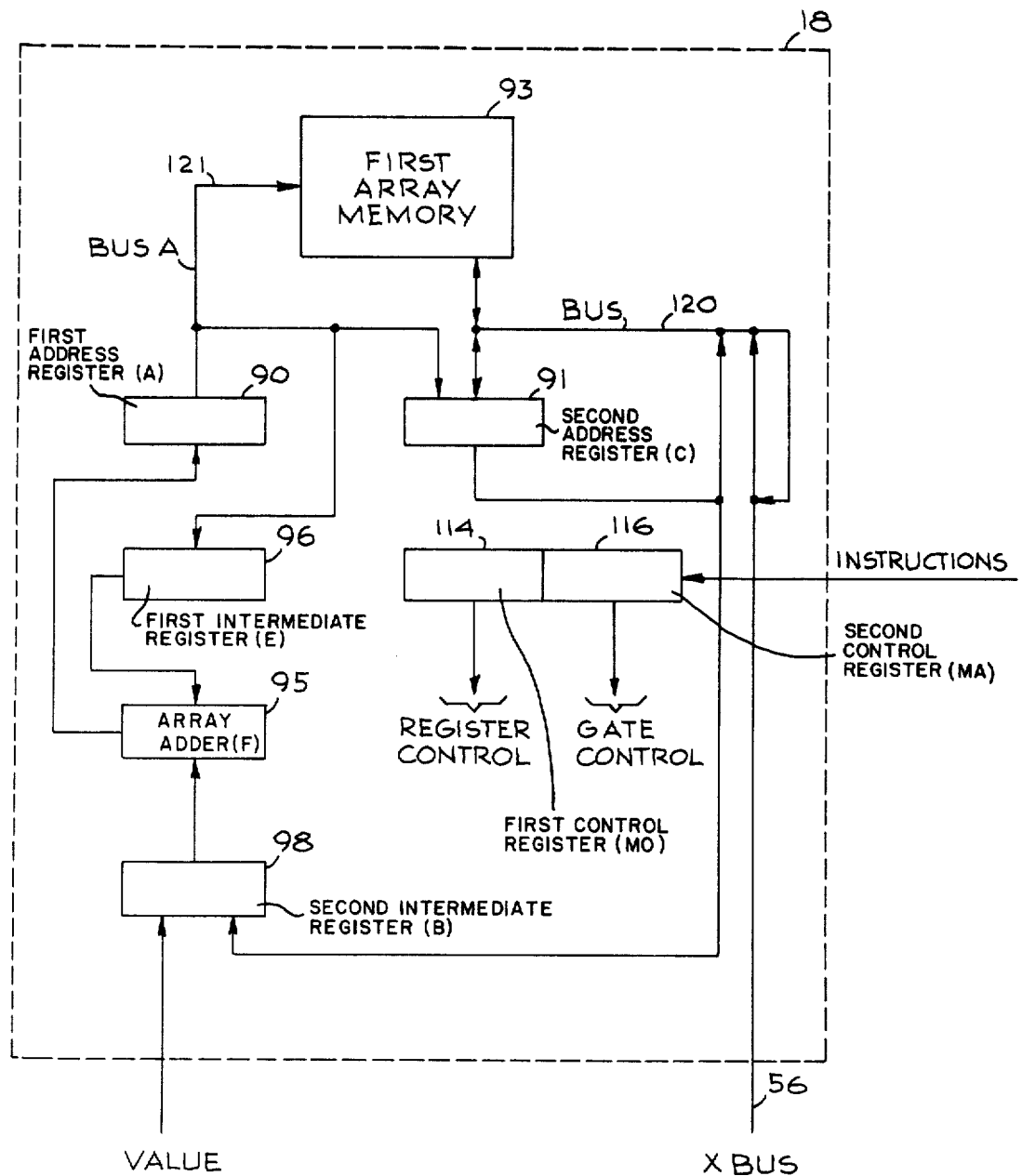
FIG. 4 is a block diagram showing an addressing means for a two-dimensional array.

FIG. 4 shows a block diagram of various registers associated with the first or X array 18. First and second address registers A and C, 90 and 91, respectively, are provided to access memory locations in a first array memory 93. The second address register 91 is also referred to as an indexing register as explained below. An F or array adder 95 is provided, the adder 95 having inputs from a first intermediate or E register 96 and a second intermediate or B register 98. Operation of the first array 18 can be understood in reference to FIG. 5 and Tables 14 and 15 below.

TABLE 14

| CODE | A | MOVE |
|------|------|--------|
| 0 | NOOP | NOOP |
| 1 | A + 1 | XBS →X |
| 2 | A + 2 | X →XBS |
| 3 | A − 1 | XBS →C |
| 4 | A − 2 | C →XBS |
| 5 | C | A →C |
| 6 | A + C | A →C →X |
| 7 | A+C+1 | A →C →XBS |
| 10 | A+C−1 | C →X |
| 11 | A − C | X →C |
| 12 | A−C+1 | |
| 13 | A−C−1 | |
| 14 | VALUE | |
| 15 | A+VALUE | |
| 16 | A−VALUE | |
| 17 | | |

TABLE 15

| CODE | MO | MA |
|------|-------|--------|
| 0 | M000 | XEL |
| 1 | M001 | XWRTL |
| 2 | EφP0 | BUSASE |
| 3 | EφP1 | CLD |
| 4 | FφP0 | CBUS |
| 5 | FφP1 | XBUSBUS |
| 6 | CVALSE | BUSXBS |
| 7 | BZERO | |

Figure 5:
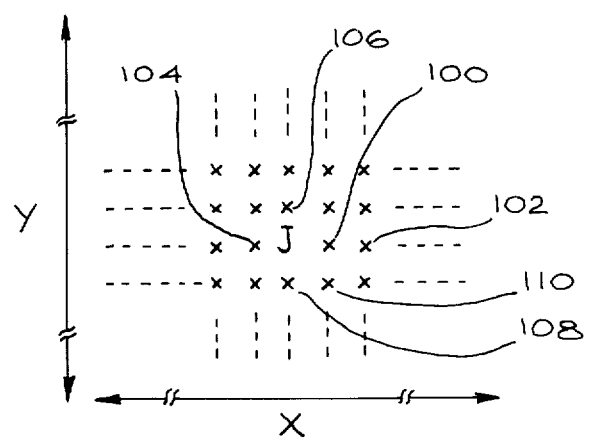
FIG. 5 is a diagrammatic representation showing an array and associated memory locations.

Referring to FIG. 5, assume that J is an address location in a two-dimensional array, and that a series of calculations are desired to be performed utilizing numbers contained in addresses having a vectorial relation to the J address. Code 1 shown in Table 14 causes a 1 to be added to the J address, thus causing memory location 100 to be accessed in the two-dimensional array shown in FIG. 5. Code 2 causes memory location 102 to be accessed. In a similar manner Code 3 causes memory location 104 to be accessed. Now, if the contents of the C address or indexing register 91 contains the same number of memory locations as the number of X columns in the two-dimensional array, then Code 6, which corresponds to memory location J+X, causes memory location 106 to be accessed. In a similar manner code 11 will cause memory location 108 to be accessed. Code 12 will cause memory location 110 to be accessed. The initial memory location identified by J, i.e., the contents of the A address register 90, can be altered by Codes 15 and 16. Transfers between registers can be effected by the codes associated with the MOVE column of Table 14. Instructions are received by a first control register MO and a second control register MA, 114 and 116, respectively. As can be seen in Table 15, Codes 0 and 1 control operational states of the MO register 114; Codes 2 and 3 control the E register 96; Codes 4 and 5 control the F adder 95; Code 6 selects the value in the C register 91; and Code 7 sets the B register 98 to zero. The MA control register 116 responds to Code 0 by enabling the first array memory 93, Code 1 by causing the first array to memory 93 to provide the contents of an accessed memory location on a BUS line 120, Code 2 by causing a Bus A line 121 to be selected, Code 4 by causing the contents of the C register 91 to be placed on the Bus line 120, Code 5 by causing the signal on the X Bus 56 to be provided on Bus line 120, and Code 6 by causing the contents of the Bus line 120 to be placed in the X Bus 56. Thus, the addressing system above described allows a two-dimensional array to be simply and quickly accessed by merely storing the number of memory locations in one row. The second array 20 is configured the same as the first array 18.

As one can now appreciate, an array prossessor, its architecture, and controls have been described in which two two-dimensional arrays can be simultaneously accessed, and multiplications, addition, subtraction, transfer and storage operations performed. An interconnection architecture and control scheme has been described which allows the various steps required in an array computation including arithmetic and data transfer operations to be executed in parallel. This parallel execution is achieved as a consequence of implementing the internal data registers and arithmetic circuits to receive multiple data inputs, and by controlling them in accordance with the described instruction format.

What is claimed is:

1. An array processor comprising:
    multiplication means;
    multiplication input means to said multiplication means, said multiplication input means comprising first and second input registers;
    first and second latch means each of which is operatively connected to at least one of said input registers;
    output means from said multiplication means;
    storage means;
    addition and subtraction means responsive to contents of said multiplication output means and said storage means;
    first and second arrays;
    means for providing signal inputs from said first and second arrays to said multiplication input means, said storage means, and said addition and subtraction means; and
    interconnection means allowing selected multiplication, storage, addition and subtraction, and transfer operations to occur in parallel in response to predetermined input instructions, said interconnection means comprising means for connecting said first latch means to said first array and said second latch means to said second array.

2. The system of claim 1 wherein said interconnection means further comprises means for connecting said first array and said second array to said first and second input registers.

3. The system of claim 2 wherein said addition and subtraction means comprises first, second and third adders and said output means comprises first and second output registers, and said interconnection means further comprises;
means for connecting said first output register to said first, second and third adders;
means for connecting said second output register to said second and third adders;
means for connecting said first array to said second and third adders; and
means for connecting said second array to said second and third adders.

4. The system of claim 3 wherein said storage means comprises first, second, third and fourth storage registers, and said interconnection means further comprises;
means for connecting an output from said first adder to said first and second storage registers;
means for connecting an output from said second adder to said second and third storage registers;
means for connecting an output from said third adder to said third and fourth storage registers;
means for connecting said first array to said first storage register;
means for connecting an output from said first storage register to said first array, to said first adder, and to said second adder;
means for connecting an output from said second storage register to said first array, said second adder, said second array, and said third adder;
means for connecting an output from said third storage register to said first array, said second adder, said second array, and said third adder; and
means for connecting an output from said fourth storage register to said second array and said third adder.

5. The system of claim 1 wherein said multiplication means further comprises input means for identifying that one of said multiplication means input registers contains a value defining a fraction.

6. The array processor of claim 1 wherein said first array is a two-dimensional array formed of X columns and Y rows, said array processor further comprising means for accessing said first array comprising:
an address register for identifying a predetermined location within said first array; and
means for addressing vector locations within said first array with respect to said predetermined location.

7. The array processor of claim 6 wherein said means for addressing comprises:
an indexing register for storing an address increment equal to the number of X columns;
means for indexing said address register by the contents of said indexing register and N, where N could be zero, a positive integer, or a negative integer; and
means for altering the contents of said address register.

8. An array processing system comprising:
a first two-dimensional array;
means for accessing said first array;
a second two-dimensional array;
means for accessing said second array;
a multiplication means;
first and second multiplication means input registers;
first and second multiplication means output registers;
first and second latch registers;
first, second, and third adders;
first, second, third and fourth storage registers;
a first bus;
a second bus;
interconnection means for connecting said first bus to said first array, said first latch, said first and second input registers, said second and third adders, and said first storage register;
interconnection means for connecting said second bus to said second array, said second latch, said first and second input registers, said second and third adders, and said fourth storage register;
interconnection means for connecting said first latch to said first input registers;
interconnection means for connecting said second latch to said second input register;
interconnection means for connecting said first multiplication means output register to said first, second, and third adders;
interconnection means for connecting said second multiplication means output register to said second and third adders;
interconnection means for connecting said first adder output to said first and second storage registers;
interconnection means for connecting said second adder output to said second and third storage registers;
interconnection means for connecting said third adder output to said third and fourth storage registers;
interconnection means for connecting said first storage register output to said first bus and said first and second adders;
interconnection means for connecting said second storage register output to said first bus, said second bus, said second adder and said third adder;
interconnection means for connecting said third storage register to said first bus, said second bus, said second adder and said third adder;
interconnection means for connecting said fourth storage register to said second bus and said third adder; and
control means whereby a single input instruction can cause multiplication, addition, subtraction, and transfer operations within said system to occur simultaneously.

9. The array processing system of claim 8 wherein said first two-dimensional array is formed of X columns and Y rows, said means for accessing said first array comprises;
an address register for identifying a predetermined location within said first array; and
means for addressing vector locations within said first array with respect to said predetermined location.

10. The array processing system of claim 9 wherein said means for addressing comprises:
an indexing register for storing an address increment equal to a multiple of the number of X columns;
means for indexing said address register by the contents of said indexing register and N, where N could be zero, a positive integer, or a negative integer; and
means for altering the contents of said address register.

11. The array processing system of claim 10 further comprising means for selectively applying the contents of an addressed location in said first array to said first bus.

* * * * *